UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

BLUE ANTHRAQUINONE DYE.

SPECIFICATION forming part of Letters Patent No. 648,331, dated April 24, 1900.

Application filed January 24, 1900. Serial No. 2,641. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in Coloring-Matters of the Anthraquinone Series, of which the following is a specification.

It is known that if dinitro-anthraquinone be boiled with anilin or with other primary aromatic amins dianilido-anthraquinones or the homologous dialphylido-anthraquinones are obtained. Further, it is known that if these products be treated with an excess of chlorin or bromin in the presence of a suitable solvent halogen substitution products are obtained. (See, for instance, Letters Patent No. 631,606.)

My present invention relates to the manufacture of new coloring-matters by treating the said halogen derivatives with concentrated sulfuric acid and boracic acid and subsequently converting the products thus obtained into sulfoacids soluble in water by sulfonation.

The following example will serve to illustrate my invention and the manner in which it can best be carried into practical effect and the new coloring-matters obtained.

Example: Mix together one hundred (100) parts of the bromin derivative of dianilido-anthraquinone, such as can be obtained according to the second example of the specification of the Letters Patent No. 631,606, and one hundred (100) parts of boracic acid free from water. Add this mixture to about two thousand (2,000) parts of concentrated sulfuric acid, (containing about ninety-six per cent. $H_2SO_4$.) Stir for about twenty-four hours at the ordinary temperature. The melt assumes a beautiful violet color. To complete the reaction, heat the mixture for about twelve hours at a temperature of about 70° to 100° centigrade. Then in order to sulfonate the product add about two thousand (2,000) parts of fuming sulfuric acid (containing about forty per cent. free anhydride) to the melt and heat the mixture to about 1300° centigrade and continue heating until the coloring-matter is readily soluble in water. Work up the melt in the usual way by diluting the melt, salting out the coloring-matter with common salt, and filtering. The coloring-matter is then obtained in the form of a blue paste, which when dry yields a violet-blue powder. It is moderately soluble in water, giving a blue solution. In alcohol and anilin it dissolves, giving a pure blue color. In caustic soda the solution is green-blue and green in concentrated sulfuric acid. My new coloring-matter thus obtained dyes unmordanted wool, giving blue shades, and chrome mordanted wool, giving greenish-blue shades. Similar products can be obtained in an analogous manner by treating the chlorin derivatives of dianilido-anthraquinone or the halogen derivatives of other alphylido-anthraquinones in a similar way. The properties of the products so obtained can be seen from the following table:

| Coloring-matter from— | Appearance in the form of paste. | Appearance of powder. | Solubility in water. | Caustic-soda solution. | Concentrated-sulfuric-acid solution. | Alcoholic solution. | Anilin solution. | Color of unmordanted wool. |
|---|---|---|---|---|---|---|---|---|
| Brom 1.5-dianilido-anthraquinone. | Blue | Violet | Moderately soluble; blue. | Green-blue | Green | Blue | Blue | Blue. |
| Brom 1.8-dianilido-anthraquinone. | Dark-green blue. | Black with metallic luster. | Green-blue | Blue-green | ...do | ...do | ...do | Green-blue. |
| Brom 1.5-di-para-toluido-anthraquinone. | ...do | ...do | Very slightly soluble; blue. | Slightly soluble; green. | ...do | ...do | ...do | Blue-green. |
| Chlor 1.5-dianilido-anthraquinone. | Dark blue | ...do | Blue | Green-blue | Blue-green | Blue-violet. | ...do | Violet-blue. |

In my present application for patent I desire to claim generically my new coloring-matters that can be obtained from the halogen derivatives of dialphylido-anthraquinone, and specifically I desire to claim that coloring-matter which can be obtained by the treatment of the bromin derivative of 1.5 dianilido-anthraquinone with concentrated sulfuric acid and boracic acid and subsequently with fuming sulfuric acid in the manner illustrated in the example.

Now what I claim is—

1. As a new article of manufacture the coloring-matter which can be obtained by the treatment of a halogen derivative of alphylido-anthraquinone with sulfuric acid and boracic acid and subsequently sulfonating, and which is characterized by the following properties: it contains halogen, it is soluble in water, in caustic-soda solution, in concentrated sulfuric acid, in alcohol, and in an'lin, and it dyes unmordanted wool giving shades within the range from violet-blue to bluish green all substantially as described.

2. As a new article of manufacture the new color which can be obtained by treating brom 1.5.-dianilido-anthraquinone with sulfuric acid and boracic acid and subsequently sulfonating and which contains halogen, is moderately soluble in water giving a blue color, soluble in alcohol and anilin giving a pure blue solution, and which dyes unmordanted wool, giving blue shades and chrome-mordanted wool giving green-blue shades, all substantially as described.

In testimony whereof I have hereunto set my hand in the presence of two subscribing witnesses.

OSCAR BALLY.

Witnesses:
ERNEST G. EHRHARDT,
PERCY J. JONES.